United States Patent [19]

Kashiwagi

[11] 4,436,391

[45] Mar. 13, 1984

[54] APPARATUS FOR PROJECTING ANY SELECTED IMAGE IN A RECORDING MEDIUM HAVING IMAGES RECORDED THEREON IN AT LEAST TWO LINES

[75] Inventor: Kazuo Kashiwagi, Tokyo, Japan

[73] Assignee: Canon Kabushiki Kaisha, Tokyo, Japan

[21] Appl. No.: 410,450

[22] Filed: Aug. 23, 1982

[30] Foreign Application Priority Data

Sep. 12, 1981 [JP] Japan ............................... 56-144138
Sep. 12, 1981 [JP] Japan ............................... 56-144139

[51] Int. Cl.³ ............................................ G03B 23/12
[52] U.S. Cl. ................................. 353/26 R; 353/101; 353/81
[58] Field of Search ............... 353/27 R, 27 A, 26 R, 353/26 A, 81, 100, 101, 25; 355/54, 53, 51, 41

[56] References Cited

U.S. PATENT DOCUMENTS

| | | | |
|---|---|---|---|
| 2,569,918 | 10/1951 | Berggren | 353/81 X |
| 3,354,776 | 11/1967 | Smitzer et al. | 353/81 X |
| 3,751,152 | 8/1973 | Rinehart | 353/27 A X |
| 3,793,507 | 2/1974 | Blizard et al. | 353/26 A X |
| 3,981,574 | 9/1976 | Jesensky et al. | 353/81 X |
| 4,043,652 | 8/1977 | Mickelson | 353/26 A |

FOREIGN PATENT DOCUMENTS 1918093 10/1970 Fed. Rep. of Germany ... 353/26 A

Primary Examiner—Harry N. Haroian
Attorney, Agent, or Firm—Fitzpatrick, Cella, Harper & Scinto

[57] ABSTRACT

An apparatus for projecting on a projection surface any desired image in a recording medium having images recorded on at least two lines on the medium. Line changing device is provided to change the line of images to be projected on the projection surface. In the projection light path there is provided image rotator for changing the orientation of the image projected on the projection surface. In response to the operation of the line changing device, the image rotator is driven so as to project the image in the proper orientation for observation on the projection surface.

15 Claims, 11 Drawing Figures

APPARATUS FOR PROJECTING ANY SELECTED IMAGE IN A RECORDING MEDIUM HAVING IMAGES RECORDED THEREON IN AT LEAST TWO LINES

BACKGROUND OF THE INVENTION

1. Field of the Invention

The present invention relates to an apparatus for projecting an image selected among images recorded on a recording medium with the image being arranged in at least two lines.

2. Description of the Prior Art

In a projector such as a film reader or film reader-printer there are used two different types of films as shown in FIGS. 1 and 2. The film 2 shown in FIG. 1 is the first type of film on which images 1 are recorded arranged in single line. The film 4 shown in FIG. 2 is the second type one on which images 3 are recorded arranged in two lines. Designated by m are marks used for retrieving the desired one of the recorded images. The retrieving marks m have a different density from the image portion of the film and have been provided along one long side (FIG. 1) or along two long sides of the film (FIG. 2).

The method for taking pictures employing the second type of film 4 is generally called duo-method. According to the duo-picture taking method, the film 4 loaded on a camera is at first moved in the forward direction from the leading end to the trailing end of the film while taking pictures serially one half area of the film along one long side thereof (first line). After the end of picture taking in the first line, the film is taken out from the camera and then reloaded in the camera reversing the leading end and the trailing end of the film. Now, pictures are serially taken on the remaining half area along the other long side of the film from the trailing end to the leading end (second line). Therefore, after the end of all of exposures, the film has recorded images arranged in two lines, a first and a second line. As viewed in FIG. 2, the leading end of the film is on the left-hand side and the trailing end is on the right-hand side. For the sake of explanation, the images recorded in two lines on the film 4 are numbered in the order of the exposed frame (in practice such numbers are never recorded in the film). Retrieving marks m are really provided along both sides of the film one mark to one image frame.

In the film for the duo-method described above, as seen in FIG. 2, the images in the second line are upside down as compared with the images in the first line. One image frame with one retrieving mark in the first line and the corresponding one frame with one retrieving mark in the second line are symmetrical relative to the center on the center line of the film passing through between the first line images and the second line images.

When such a duo-film as the film 4 is used, there arises a problem in projecting any desired image selected from the images recorded on the film. For such a duo-film it is the conventional method to project two images in the first and second lines at the same time on a projection surface such as a screen. Since two images are projected on the screen at the same time, the observer can not understand at once which is the desired image. Furthermore, it is required for the operator or observer to turn the projected image to its proper position for observation. This work causes the operator problems. The problem is enhanced when there is used a film having images recorded therein in three or more lines.

SUMMARY OF THE INVENTION

Accordingly, it is an object of the invention to provide a projector which solves the problem mentioned above.

It is another object of the invention to provide a projector with which only one image on one line can be projected on the screen.

If is a further object of the invention to provide a projector which can project the selected image in one line on the screen while automatically orienting the image in the proper position for observation.

It is a further object of the invention to provide a projector which is able to automatically position the desired line of images in the projection light path.

It is also an object of the invention to provide a projector which can automatically retrieve any desired image.

Other and further objects, features and advantages of the invention will appear more fully from the following description taken in connection with the accompanying drawings.

DESCRIPTION OF THE PREFERRED EMBODIMENTS

Figure 4:
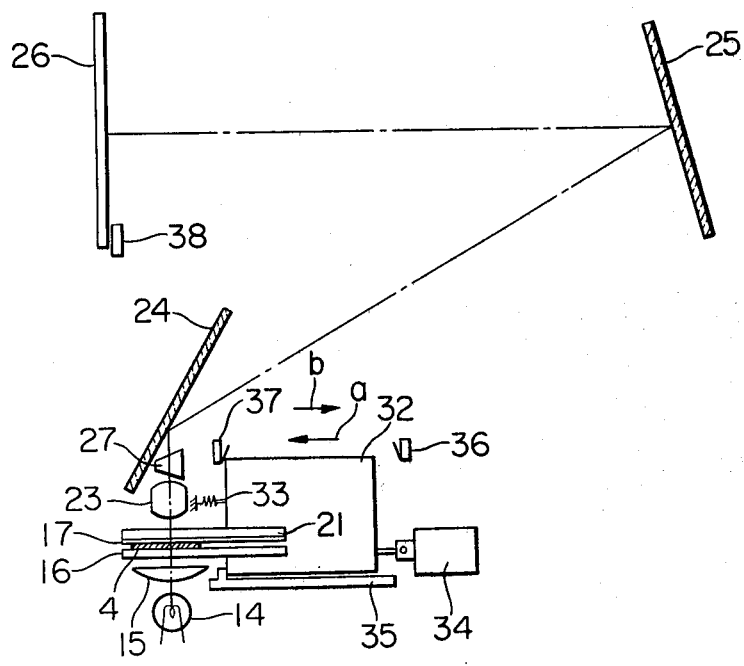
FIG. 4 is a sectional view thereof.
Figure 5:
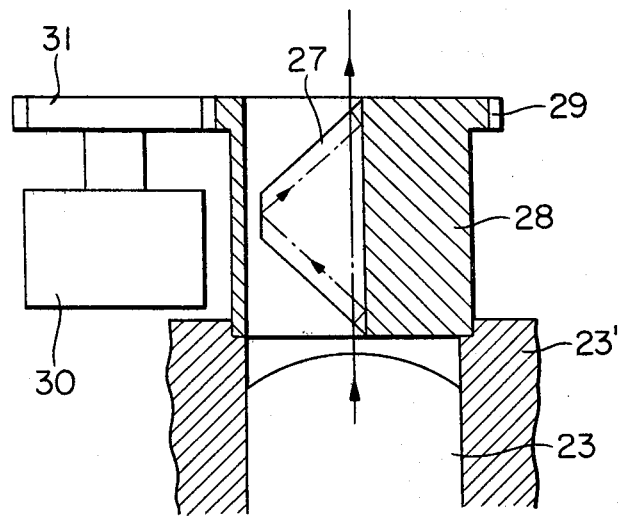
FIG. 5 is a sectional view showing the arrangement of a prism rotating mechanism.

Referring to FIGS. 4 and 5 there is shown a microfilm reader with retriever in which the present invention has been embodied.

Figure 1:
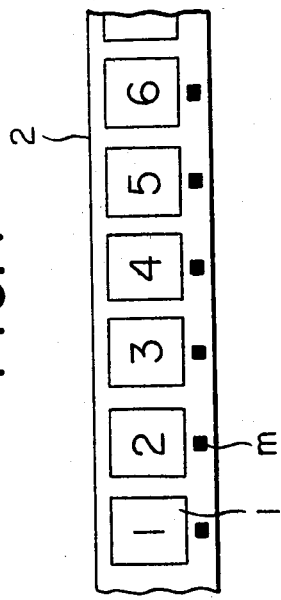
FIGS. 1 and 2 are front views of two different microfilms.
Figure 2:
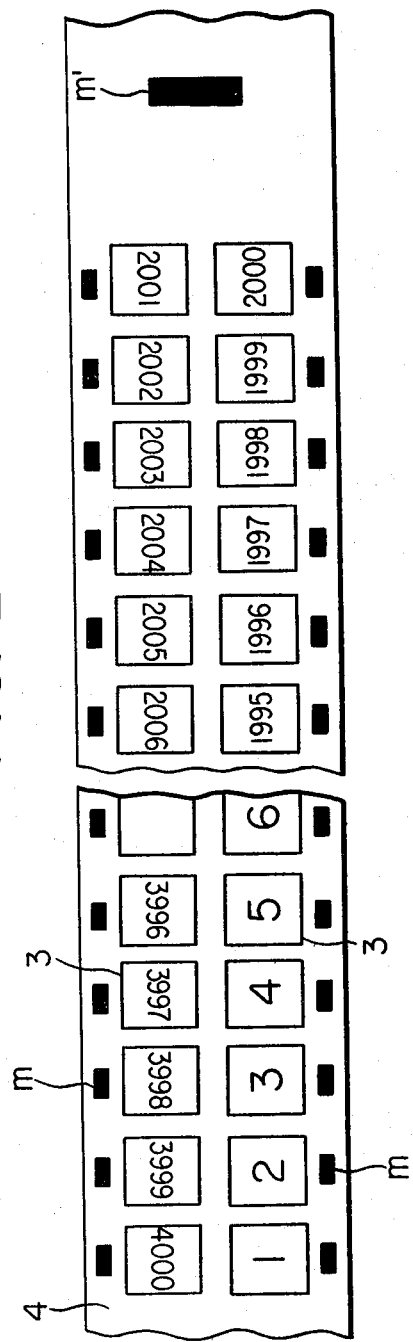
Figure 3:
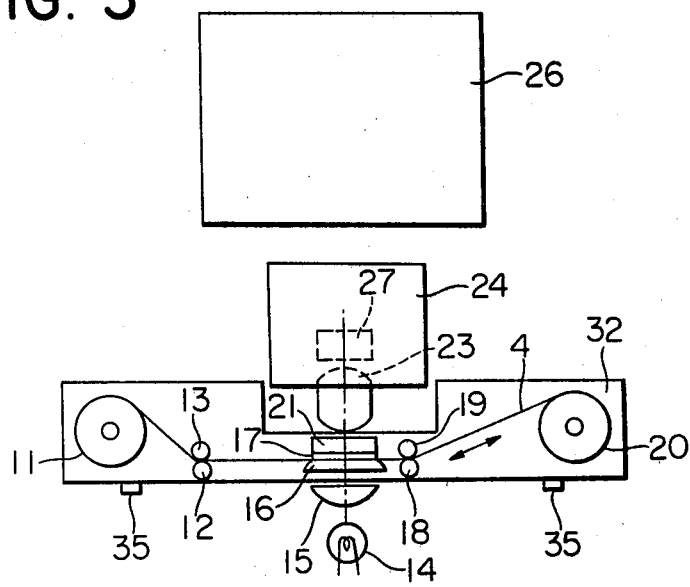
FIG. 3 is a schematic view of a film reader showing an embodiment of the invention.

In FIGS. 3 and 4, 11 is a film supply reel, 12 and 13 are guide rollers and 14 is a lamp for illuminating a film 4 which is of the type shown in FIG. 2. 15 is a condenser lens. 16 and 17 are glass plates disposed opposed to each other with the film moving path therebetween. 18 is a capstan roller, 19 is a pinch roller and 20 is a film take-up reel. The film supply reel 11 and the film take-up reel 20 are connected to a film tension/winding motor. The capstan roller 18 is connected to a film driving motor (the torque of which is larger than that of the film tension/winding motor). The microfilm 4 extends between the supply reel 11 and the take-up reel 20. With the forward rotation of the capstan roller 18, the microfilm is wound on the take-up reel and with the reversed rotation of the capstan roller the microfilm is rewound on the supply reel.

23 is a projection lens, 24 is a first reflective mirror and 25 is a second reflective mirror. 26 is a screen. The projection lens 23, the first and second mirrors 24 and 25, and the screen 26 are stationary. As previously described, the microfilm 4 has images arranged in two lines. However, the lamp 14 is disposed to illuminate only a selected line of images at the area of the selected image. The illumination light transmitted through the microfilm 4 enters the lens 23. After passing through the lens, the light is directed to the screen 26 through the reflecting mirrors 24 and 25. Thus, the illuminated image in the film is projected on the screen 26 as an enlarged image.

Designated by 27 is a frustum prism whose function is to rotate optically the image projected through the lens 23. As shown in FIG. 5, the prism 27 is on a holder 28 which is in turn rotatably supported by the lens tube 23' of the lens 23. The holder 28 has a gear 29 formed on the circumference. The gear 29 is in mesh with a gear 31 on the rotation shaft of a motor 30. The motor 30 can rotate in the forward and reverse directions. With the rotation of the motor 30, the holder 28 is rotated through the gear 31. Together with the holder 28, the prism 27 is also rotated whereby the projected image on the screen 26 is rotated up to the position in which the projected image on the screen is in the proper position for observation.

All of the above members, supply reel 11, guide rollers 12, 13, glass plates 16, 17, capstan roller 18, pinch roller 19, and take-up reel 20 are supported on a carriage 32. As seen in FIG. 4, the carriage 32 is connected with a coil spring 33 at one side and with a solenoid 34 at the opposite side. When the solenoid 34 is actuated, the carriage 32 moves in the direction arrow b along a rail 35. When the solenoid is deenergized, the carriage moves back to its starting position under the force of the coil spring 33 in the direction of arrow a. Therefore, the film 4 is shifted together with the carriage 32 in the direction perpendicular to the film feed direction. More particularly, when the solenoid 34 is in operation, an image in the first image line of the film is brought into the optical path of the lens 23. When the solenoid 34 is out of operation, an image in the second image line is brought into the optical path. In this manner, any selected one of the image lines of the film 4 can be set correctly in the projection light path by ON-OFF of the solenoid 34. Instead of the solenoid, there may be used a motor to move the carriage 32. It is also possible to manually move the carriage 32.

36 is a first line detector and 37 is a second line detector. The line detectors 36 and 37 are turned ON and OFF according to the position of the carriage 32 to detect the image line now in the optical path of the lens 23. When the first image line is in the optical path, the first line detector 36 detects the carriage 32 and issues out a high level output signal as a first line detection signal. Similarly, when the second image line of the film 4 is in the optical path, the second line detector 37 produces a high level output signal as a second line detection signal.

To detect the retrieving mark m there is provided a photo sensor 38 behind the screen 26. The photo sensor 38 may be composed of photo transistor, photo diode, etc. The photo sensor is stationary and is so positioned as to receive the light signal from any one of the retrieving marks m marked along the first and second image lines with one mark per one image frame. In the case wherein the mark m is an opaque mark for cutting off the light from the lamp 14, the photo sensor 38 produces a high level signal as a mark detection signal when the light is cut off by the opaque mark m. If the mark m is formed as a transparent mark, the photo sensor 38 puts out the mark detection signal when the light is transmitted through the transparent mark m. In the shown embodiment, the photo sensor 38 has been positioned behind the screen. However, it is to be understood that the photo sensor may be positioned at any other position between the prism and the screen provided that the position is suitable for receiving the light signal from the mark.

Figure 6A:
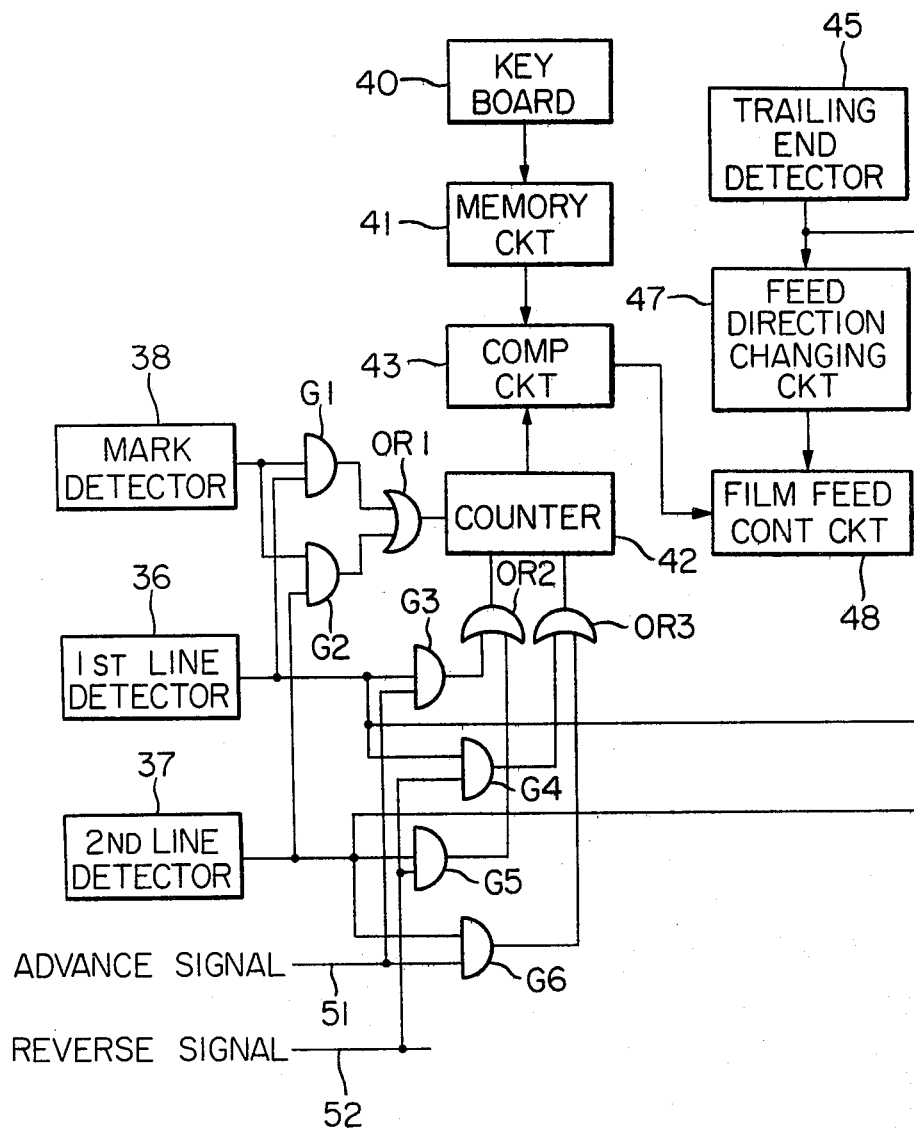
FIG. 6 composed of FIG. 6A
FIG. 6B shows the arrangement of a retrieving apparatus.
Figure 6B:
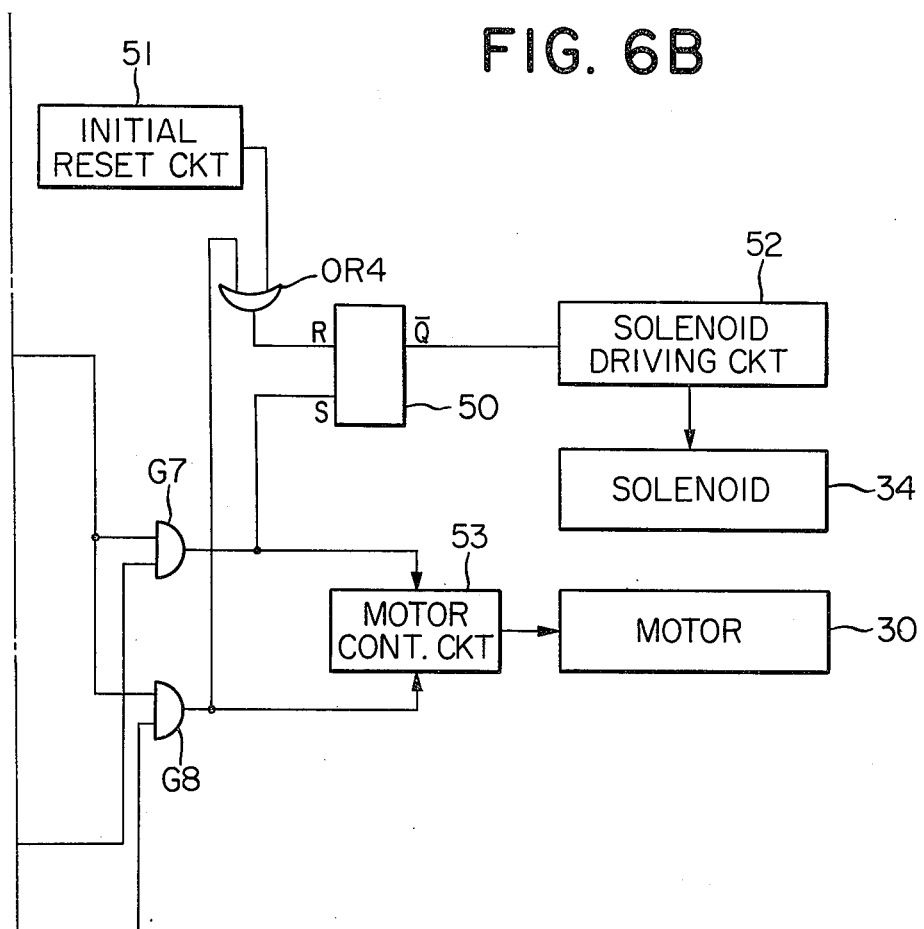
Figure 6:
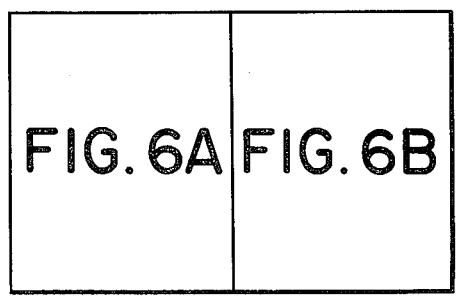

FIG. 6 shows the arrangement of a retriever used in the above film reader.

In FIG. 6, 40 is a key board for key-input of the address number (frame number) of the desired image to be projected. 41 is a memory circuit for memorizing the input address number by the key board, and 42 is an up-and-down counter for addition counting or subtraction counting of the mark detection signal from the mark detector 38. In the position for addition counting, the counter 42 counts up the mark detection signals. In the position for subtraction counting, it counts down the signals. The content A of the counter 42 and the content B of the memory 41 are compared with each other by a comparator circuit 43 to find out $A-B=C$. According to the sign of the found value C, the comparator produces a signal to indicate the direction in which the film is to be driven. When the two contents A and B are in coincidence ($A-B=C=0$), the comparator issues out a stop signal. 45 is a trailing end detector for detecting that the last two images of the film 4 (images numbered "2000" and "2001" in FIG. 2). has been fed to the take-up reel 20.

Figure 7:
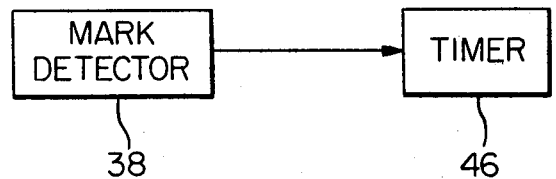
FIG. 7 shows an embodiment of the trailing end detector used in the apparatus.

FIG. 7 shows a form of the trailing end detector 45. In this embodiment, the trailing end detector comprises a timer 46. This form of the trailing end detector is based on the realization that the distance between the marks m is constant and therefore the mark detection signals appear at regular time intervals. The timer 46 is a timer which operates at a time interval longer than the time interval of the mark detection at the normal running speed of the film. The timer 46 is reset so long as the mark detection signals are being issued in series from the mark detector 38 at the regular intervals during the film feeding. The timer 46 produces a high level output signal as a trailing end detection signal only when no mark detection signal is emitted from the mark detector before the present timer time of the timer 46 has passed. As the timer 46 there may be used a known timer.

The trailing end detection signal is applied to a feed direction changing circuit 47. It issues out a direction reversing signal when it receives the trailing end detection signal. 48 is a film feed control circuit for controlling the film feeding motor provided to drive the capstan roller 18. When a stop signal is applied to the control circuit 48 from the comparator 43, the control circuit stops the motor. When a reversing signal is applied to it from the feed direction changing circuit 47, the control circuit 48 reverses the motor after stopping it. In response to the stop signal from the comparator 43, a brake (not shown) is brought into operation to prevent the rotation of the capstan roller 18.

$G_1$ to $G_8$ are AND-gates and $OR_1$ to $OR_4$ are OR-gates. 50 is a flip-flop circuit and 51 is an initial reset circuit. When the power source switch of the apparatus is turned ON, the initial reset circuit 51 issues a high level output signal. The flip-flop 50 is reset by the high level signal from the initial reset circuit 51. 52 is a solenoid driving circuit for controlling the operation of the solenoid 34. In response to the reset of the flip-flop 50, the solenoid driving circuit actuates the solenoid 34.

53 is a motor control circuit for controlling the motor 30 by which the prism 27 is rotated. When AND-gate $G_7$ is opened, the motor control circuit 53 puts the motor 34 in rotation in a determined direction to rotate the prism up to the position in which the image in the second line on the film can be projected on the screen 26 in the proper orientation for observation. When AND-gate $G_8$ is opened, the prism is rotated in the opposite direction to the above so as to project the selected image in the first line on the screen in the proper orientation for observation. In either case, when an image is projected on the screen in the proper position for observation of the image, the mark m is always projected on the photo sensor 38 at its same position (light reception surface).

AND-gates $G_1$ and $G_2$ are opened and are closed according to the output signals from the line detectors 36 and 37, respectively. An output is introduced into the counter 42 every time gates $G_1$ and $G_2$ are opened. The counter 42 counts up or down the output.

AND-gates $G_3$–$G_6$ issue control signals for controlling the addition and subtraction operation of the counter 42.

51 and 52 are signal lines to which there is applied a signal informing of the film feed direction. When the microfilm 4 is being fed in the direction towards the take-up reel 30 (which direction is referred to as advance direction), a high level advance signal is applied to the signal line 51. When the film is being driven in the direction for rewinding it on the supply reel 11 (which direction is referred to as reverse direction), a high level reverse signal is applied to the signal line 52. The advance signal and reverse signal can be obtained, for example, from the feed signal issued from the comparator 43 or from the detection of rotational direction of the capstan driving motor.

AND-gate $G_3$ is opened to issue an addition signal only when the first line detection signal from the first line detector 36 and the advance signal from the signal line 51 are applied to the gate. AND-gate $G_4$ is opened to a subtraction signal only when the first line detection signal and the reverse signal are applied to the gate. AND-gate $G_5$ is opened to issue an addition signal only when it receives the second line detection signal from the second line detector 37 and also the reverse signal from the signal line 52. AND-gate $G_6$ is opened to issue a subtraction signal only when it receives the second line detection signal and the advance signal. The counter 42 is switched over to the state for addition by the addition signal and to the state for subtraction by the subtraction signal. In other words, when the first image line of the film is in the projection light path, the counter 42 is in the state for addition during the running of the film in the advance direction but in the state for subtraction during the running of the film in the reverse direction. When the second image line is in the projection light path, the counter is in the state for subtraction during the running of the film in the reverse direction but in the state for addition during the running of the film in the advance direction.

The manner of operation of the above apparatus is as follows:

For the purpose of explanation it is assumed that the microfilm 4 is now in the position in which the first image line is in the optical path of the projection lens 23 and an image in the first line is being projected on the screen in the proper orientation for observation. In this position, the content of the counter 42 is a count value corresponding to the address number of the image now being projected on the screen. Also, the first line detector 36 detects the carriage 32 and produces a first line detection signal. Therefore, the flip-flop 50 is in its reset position and the solenoid 34 is ON.

In this state of the apparatus, if the operator wishes to project an image in the second line on the screen, he will input the address number of the desired image in the second line of the film 4 by means of the key board 40. Upon the input of the address number, the state of two inputs to the comparator 43 is changed to $A-B=C>0$. Therefore, the comparator issues an advance feed signal which is applied to the film feed control circuit 48. In response to the input signal, the control circuit drives the film feeding motor in the direction to feed the microfilm 4 toward the take-up reel 20. Since the first line detector 36 is detecting the carriage and the film is now moved in the advance direction, AND-gate $G_3$ is opened so that the counter 42 is switched over to the state for addition. At the same time, AND-gate $G_1$ is opened and the counter 42 counts up the mark detection signals from the mark detector 38. When the last image of the first line (image number "2000" in FIG. 2) has passed over the detection area of the mark detector 38, a trailing end detection signal is issued from the trailing end detector 45. In response to the end signal, the film feeding motor is stopped. On the other hand, the end signal renders AND-gate $G_7$ open. The flip-flop 50 is set by the output from the gate $G_7$, and therefore the solenoid is turned Off. Consequently, the carriage 32 is moved in the direction of arrow a by the force of the spring 33 to bring the second image line of the microfilm into the projection light path. When the image area of the second line of the film enters the projection light path, that is, when the second line detector 37 detects the carriage 32, the carriage is stopped.

After stopping the carriage, reverse signal is issued from the feed direction changing circuit 47. In response to the reverse signal, the film feed control circuit 48 is driven in the reverse direction to feed the film in the reverse direction. Also, AND-gate $G_7$ issues an output signal which drives the motor 30 through the motor control circuit 53. Thereby, the prism 27 is rotated up to the position in which the image in the second line of the film can be projected on the screen in the proper orientation for observation. When the prism 27 gets in the position, the motor 30 is stopped. Since the second line detector 37 detects the carriage and also the film is moved in the reverse direction, AND-gate $G_5$ is opened and the counter 42 takes the position for addition. On the other hand, AND-gate $G_5$ is opened to allow the mark detection signal to enter the counter 42 from the mark detector 38. The counter 42 sums up the mark detection signals from the mark detector 38. In the running of the film in the reverse direction, the count value of the counter 42 and the retrieving number in the memory 41 is in coincidence with each other at a point in time. At this point in time, the comparator 43 issues a stop signal to stop the film feeding motor. Thus, the film is stopped and the desired image in the second line is correctly set in the projection position. Since the prism 27 has already been rotated up to the position for giving the proper orientation for observation to the images in the second line of the film, the selected image in the second line is projected on the screen 26 in the proper orientation for observation. Therefore, immediately after the completion of the retrieving operation, the operator or observer can observe the selected image on the screen.

Next to the above, if the operator wishes to project an image in the first line, he makes a key input of the address of the desired image in the first line to the key board. Upon the input of the address number, the apparatus starts a retrieving operation again starting from the above position of the apparatus in the same manner as above. The microfilm is driven in the advance direction and the trailing end detector 45 detects the trailing end image of the second line. In response to the end detection signal, the solenoid 34 is actuted to move the carriage 32 in the direction of arrow b. After the first image line is brought into the projection light path, the motor 30 starts to rate the prism 27. This time, the prism 27 is rotated up to the position in which the images in the first line can be projected in the proper orientation for observation on the screen. When the prism 27 gets in the position, the microfilm 4 is fed in the reverse direction until the first mark detector 21 detects the retrieving mark belonging to the desired image. When it is detected, a stop signal is issued from the comparator 43. Thus, the film is stopped and the desired image in the first line is correctly placed in the projection position.

According to the preferred embodiment of the invention, when the apparatus is in its initial position or starting position, the carriage is always positioned in the position in which the first line of images is in the projection light path. More particularly, when a microfilm is loaded in the apparatus and the film is completely inserted into the determined film feed path, the apparatus is in the start position. In this start position, the operator can turn the power source of the apparatus ON. When the power source it turned ON, the initial reset circuit 51 issues a signal to reset the counter 42 and also actuates the solenoid 34. Thereby the carriage 32 is moved to the position in which the first image line is in the projection light path. This initial positioning of the carriage is carried out irrespective of the previous position of the carriage. Therefore, whenever the apparatus is powered ON in the start position, the loaded microfilm is always positioned in the position for projecting the image in the first line.

The above embodiment has the advantages that the brightness and resolving power of the image on the screen are kept constant and that a cheap projection lens can be used because the angle of field required for the lens is enough to project only one frame image.

For the trailing end detector there may be employed many other forms than that particularly shown in the above embodiment. For example, as suggested in FIG. 2, a particular end mark m' having a different shape from the retrieving mark m may be provided at the trailing end portion of the microfilm 4. In this case, the trailing end detector is formed to detect the end mark m'. As another example, the trailing end detector may be formed to detect the change of tension of the film. Generally, the rear edge portion of a microfilm is firmly fastened to the core of the film reel. Therefore, at the step of feeding of the trailing end, the film is tightened very much and the tension of the film is greatly increased. At last, it becomes impossible to feed the film. Making use of such a change in tension of the film the trailing end detection may be attained.

While in the above embodiment, the film feed mechanism and other members have been sifted together with the film in the direction of the film width, it is also possible to shift only the film and the reels in the direction.

Figure 8:
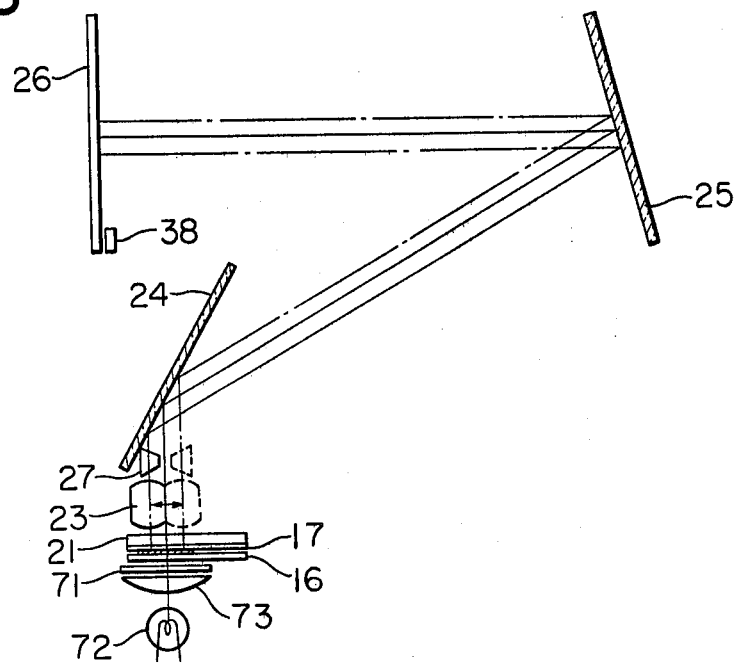
FIGS. 8 and 9 show other embodiments of the invention.
Figure 9:
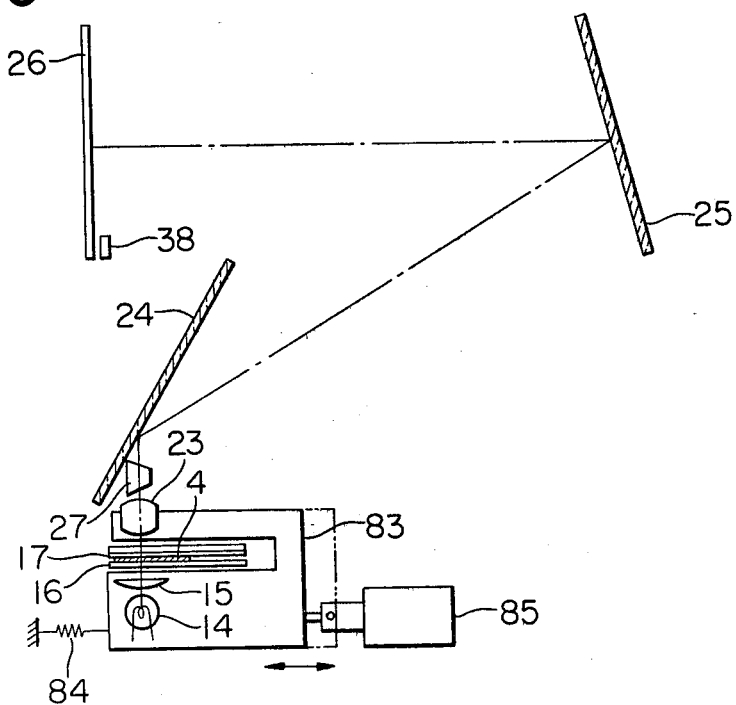

FIGS. 8 and 9 show other embodiments of the invention.

In the embodiment shown in FIG. 8, in order to change the image line to be projected on the screen, the projection lens is shifted in the direction across the width of the film. Unlike the above embodiment, the film is not shifted in this embodiment.

In FIG. 8, the projection lens 23 and the prism 27 are movably mounted in the direction of arrow, that is, in the direction across the width of the film 4. The glass plates 16 and 17 forming the guide path for the film 4 and other elements are fixedly mounted. A solenoid (not shown) is provided to move the projection lens 23 and the prism 27 together. Thus, the projection lens 23 is moved between first and second positions. In the first position, any image in the first line is projected on the screen. In the second position any image, in the second line is projected. In accordance with the shift of the lens 23, the prism 27 is rotated up to the position for projecting the selected image in the proper orientation for observation on the screen. The solenoid is driven by an output signal from the trailing end detector 45. 71 is a diffusion plate for diffusing the light from the lamp 72. The lamp 72 and the condenser lens 73 are so disposed as to illuminate both images in the first and second lines. In this embodiment, the selection of the image line for projection can be attained by shifting the lens and prism only. Therefore, this embodiment has the advantage that the shift of the elements necessary for the selection of image line of the film can be carried out at higher speed.

In the embodiment shown in FIG. 9, the projection lens 23, prism 27, lamp 14 and condenser lens 15 are mounted on a carriage 83 while the film 4, glass plates 16, 17, etc., are fixedly mounted.

The carriage 83 is movable in the direction across the width of the film 4. At one side it is connected with a coil spring 84. At the other side, a solenoid 85 is connected with the carriage. The solenoid 85 is actuated by an output signal from the above mentioned trailing end detector. When actuated, the solenoid 85 moves the carriage 83 to the position suggested by the broken line. When the solenoid is deenergized, the carriage is returned to the position indicated by the solid line. When the carriage is in the solid line position, any image in the first line of the film 4 is illuminated by the lamp 14 and correctly projected on the screen 26 through lens 23, prism 27, reflecting mirrors 24 and 25. When the carriage 83 is in the broken line position, any image in the second line is correctly projected on the screen 26 in the same manner as above. This embodiment has the advantage that the selection of image line for projection can be carried out at a higher speed and also good illumination can be obtained.

While the invention has been particularly shown and described with reference to preferred embodiments thereof, it will be understood by those skilled in the art that the foregoing and changes in form and details can be made therein without departing from the spirit and scope of the invention.

For example, the film to be read by the film reader according to the invention may also be a film having images recorded in three or more lines on the film.

Also, as image rotating means there may be used any other known methods (for example, by rotation of mirror). The recording medium is never limited to film only. The present invention is applicable to other various recording sheets.

As readily understood from the foregoing, the present invention brings forth many advantages over the prior art.

Any desired image line can be automatically positioned in the projection light path. At the same time, the selected image in any line can always be projected in the proper orientation for observation on the screen or on another projection surface. Mark detection means can remain stationary and every mark in any line can be detected by one and the same detection means. Therefore, the apparatus according to the invention is very simple in construction.

What I claim is:

1. Apparatus for projecting on a projection surface any selected image in a recording medium having images recorded thereon in at least two lines, said apparatus comprising:
    optical means for projecting on the projection surface any image in one line on said recording medium;
    image rotating means for changing the orientation of the image projected on said projection surface;
    line changing means for changing the line of images to be projected; and
    means for driving said image rotating means in response to the operation of said line changing means.

2. Apparatus according to claim 1, wherein said line changing means includes means for shifting the recording medium in the direction perpendicular to the line of images and said image rotating means is driven in response to the operation of said shift means to project the image in the proper orientation for observation on said projection surface.

3. Apparatus according to claim 1, wherein said line changing means includes means for shifting said optical means and said image rotating means in the direction perpendicular to the line of images and said image rotating means is driven in response to the operation of said shift means to project the image in the proper orientation for observation on said projection surface.

4. Apparatus according to claim 3, wherein said optical means includes an image-forming lens which is shifted in the direction perpendicular to the optical axis by said shift means.

5. Apparatus according to any one of claims 1 to 3, wherein said image rotating means includes a prism.

6. Apparatus for projecting on a projection surface any selected image in a recording medium having images and retrieving marks recorded thereon in at least two lines, said apparatus comprising:
    optical means for projecting on said projection surface any image in one line on the recording medium;
    image rotating means for optically changing the orientation of the image projected on said projection surface;
    line changing means for changing the line of images to be projected on said projection surface;
    means for driving said image rotating means in response to the operation of said line changing means; and
    mark detection means being disposed along the optical path between said image rotating means and projection surface to detect said retrieving mark in the line of images, every retrieving mark in every line being projected on said detection means at the same detection position by the driving of said image rotating means.

7. Apparatus according to claim 6, wherein said line changing means includes means for shifting said optical means and said image rotating means in the direction perpendicular to the line of images and said image rotating means is driven in response to the operation of said shift means to project the image in the proper orientation for observation on said projection surface.

8. Apparatus according to claim 6, wherein said line changing means includes means for shifting said recording medium in the direction perpendicular to the line of images and said image rotating means is driven in response to the operation of said shift means to project the image in the proper orientation for observation on said projection surface.

9. Apparatus according to claim 6, wherein said optical means includes an image-forming lens which is shifted by said shift means in the direction perpendicular to the optical axis.

10. Apparatus according to any one of claims 6 to 8, wherein said image rotating means includes a prism.

11. Apparatus according to claim 6, which further comprises feeding means for feeding the recording medium in the forward or the reverse direction; trailing end detection means for detecting the trailing end of the recording medium; and control means for changing the film feed direction of said feeding means and for driving said line changing means when the trailing end is detected by said detection means.

12. Apparatus for projecting on a projection surface any selected image in a recording medium having images recorded thereon in at least two lines, said apparatus comprising:
    optical means for projecting on said projection surface any image in one line on the recording medium;
    image rotating means for optically changing the orientation of the image projected on said projection surface;
    feeding means for feeding the recording medium in the forward or the reverse direction;
    line changing means for changing the line of images to be projected on said projection surface;
    detection means for detecting the trailing end of the recording medium; and
    control means for controlling said image rotating means, feeding means and line changing means in response to the output from said trailing end detection means.

13. Apparatus for retrieving any desired image in a recording medium having images and retrieving marks recorded thereon in at least two lines; said apparatus comprising:
    optical means for projecting any image in one line on the recording medium on a projection surface;
    feeding means for feeding the recording medium in the forward or the reverse direction;
    line changing means for changing the line of images to be projected on said projection surface, said line changing means including means for shifting said optical means while the position of the recording medium remains the same;
    first detection means for detecting the trialing end of said recording medium;
    second detection means for detecting said retrieving mark;
    counter means for adding and subtracting a signal emitted from said first detection means in accordance with the feeding direction of the recording medium;

control means for changing the feeding direction of said feeding means, and for driving said line changing means when the trailing end of the recording medium is detected by said trailing end detector; and feed control means for making a comparison between the address number of the desired image to be retrieved and the content of said counter means, and for stopping the feed of the recording medium when the address number and the content of said counter means coincides with each other.

14. Apparatus according to claim 13, wherein said optical means includes an image-forming lens which is shifted by said shift means in the direction perpendicular to the optical axis.

15. Apparatus according to claim 14, wherein said apparatus further comprises means for illuminating the recording medium, said illuminating means moving in association with said optical means.

* * * * *

UNITED STATES PATENT AND TRADEMARK OFFICE
CERTIFICATE OF CORRECTION

PATENT NO. : 4,436,391
DATED : March 13, 1984
INVENTOR(S) : KAZUO KASHIWAGI

It is certified that error appears in the above-identified patent and that said Letters Patent is hereby corrected as shown below:

COLUMN 1

Line 32, "one half" should read --on one half of the--.

Line 64, "can not" should read --cannot--.

Line 68, "is enhanced" should read --becomes greater--.

COLUMN 4

Line 26, "has" should read --have--.

COLUMN 7

Line 13, "rate" should read --rotate--.

Line 32, "it" should read --is--.

Line 62, "Making" should read --By making--;

after "film" insert --,--.

Line 65, "sifted" should read --shifted--.

Line 67, "the" (second occurrence) should read --that--.

COLUMN 8

Line 17, after "position" insert --,--;

after "image" delete --,--.

UNITED STATES PATENT AND TRADEMARK OFFICE
CERTIFICATE OF CORRECTION

PATENT NO. : 4,436,391

DATED : March 13, 1984

INVENTOR(S) : KAZUO KASHIWAGI

It is certified that error appears in the above-identified patent and that said Letters Patent is hereby corrected as shown below:

COLUMN 10

Line 63, CLAIM 13, "trialing" should read --trailing--.

COLUMN 12

Line 2, CLAIM 13, "coincides" should read --coincide--.

Signed and Sealed this

Twenty-fourth Day of July 1984

[SEAL]

Attest:

GERALD J. MOSSINGHOFF

Attesting Officer     Commissioner of Patents and Trademarks